United States Patent [19]

Yamada et al.

[11] Patent Number: 5,434,115
[45] Date of Patent: Jul. 18, 1995

[54] PROCESS FOR PRODUCING OLEFIN POLYMER

[75] Inventors: Satoru Yamada; Makoto Sone, both of Mie; Saiki Hasegawa; Akihiro Yano, both of Yokkaichi, all of Japan

[73] Assignee: Tosoh Corporation, Shinnanyo, Japan

[21] Appl. No.: 63,608

[22] Filed: May 19, 1993

[30] Foreign Application Priority Data

May 22, 1992 [JP] Japan .................................. 4-154093
May 22, 1992 [JP] Japan .................................. 4-154094

[51] Int. Cl.$^6$ ...................... C08F 4/646; C08F 10/00
[52] U.S. Cl. .................................. 502/103; 502/104; 502/117; 502/118; 502/152; 502/155
[58] Field of Search ............... 502/103, 117, 118, 152, 502/155, 104

[56] References Cited

U.S. PATENT DOCUMENTS 5,153,157 10/1992 Hlatky et al. ...................... 502/117

FOREIGN PATENT DOCUMENTS 9114713 10/1991 WIPO .

OTHER PUBLICATIONS

Rapra Abstracts, vol. 14, No. 25, Dec. 5, 1977, AN 7705114L, G. A. Beikhol, et al., "Polymerization of Ethylene in Ethyl Chloride Over Complex Catalyst System Modified by Acids and Lewis Bases".

Die Makromolekulare Chemie, Rapid Communications, vol. 13, No. 5, May 1992, Claudio Pellecchia, et al., "Polymerization of Ethylene and Propene in the Presence of Organometallic Compounds of Titanium and Zirconium Activated with Tris(Pentafluorophenyl)Boron", pp. 277–281.

*Primary Examiner*—Asok Pal
*Assistant Examiner*—Walter D. Griffin
*Attorney, Agent, or Firm*—Oblon, Spivak, McClelland, Maier & Neustadt

[57] ABSTRACT

Novel catalysts for polymerization of ethylene or α-olefins, comprising a metallocene, an organoaluminum compound an ionic compound, and a boron compound, or comprising an ionic metallocene, an organoaluminum compound and a boron compound. Process for polymerization of ethylene or α-olefins by use of the above catalysts.

2 Claims, No Drawings

PROCESS FOR PRODUCING OLEFIN POLYMER

BACKGROUND OF THE INVENTION

1. Field of the Invention

The present invention relates to a process for producing an olefin polymer by use of a polymerization catalyst comprising a metallocene, an organoaluminum compound, and an ionizable ionic compound.

The present invention also relates to a process for producing an olefin polymer by use of a polymerization catalyst comprising an ionic metallocene and an organoaluminum compound.

2. Description of the Related Art

The polymerization of ethylene or an α-olefin by a low-pressure Ziegler process is well known in the art. The catalyst therefor is prepared by mixing an organometallic compound or a hydride of an element of 1A to 3A Group of Periodic Table with a compound of a transition metal (an element of 3B to 2B Group of Periodic Table), and treating the mixture in suspension or solution or in the absence of a diluent or a solvent.

Known special kinds of catalysts active for olefin polymerization include combinations of aluminoxane with a cyclopentadienyl derivative of a metal of 4B Group such as titanium, zirconium, and hafnium, or the like. Such catalysts are disclosed in the literature "Ziegler-Natta catalyst and polymerization", Academic Press, New York (1979); Adv. Organomet. Chem. 1899 (1980); and so forth. Such catalysts advantageously exhibit high catalytic activity and are capable of producing stereoregular polyolefins. However, these catalyst have not been used in industrial polymerization, mainly because the aluminoxane cannot readily be synthesized in a reproducible state and therefore the catalysts and the polymers cannot be prepared with reproducibility.

A catalyst which offsets such problems is disclosed in Japanese Patent Application Laid-Open No. Hei-3-207704, which describes a bis(cyclopentadienyl)metal compound prepared by reaction of a metallocene with ionic compound and the use of the resulting complex as a polymerization catalyst. This catalyst, however, is not satisfactory in the catalyst activity.

The inventors of the present invention have made comprehensive study to solve the above problems of the olefin polymerization catalyst employing a metallocene and an organoaluminum compound, and completed the present invention.

SUMMARY OF THE INVENTION

An object of the present invention is to provide a novel catalyst for polymerization of ethylene or α-olefin, comprising a metallocene, an organoaluminum compound, an ionic compound, and a boron compound.

Another object of the present invention is to provide another catalyst for polymerization of ethylene or α-olefin comprising an ionic metallocene, an organoaluminum compound, and a boron compound.

Still another object of the present invention is to provide a process for polymerization of ethylene or α-olefin by use of the above novel catalyst system.

According to an aspect of the present invention, there is provided an olefin polymerization catalyst system which comprises a metallocene compound (A), an organoaluminum compound (B), and an ionic compound (C) as catalyst components: the metallocene compound (A) being represented by the general formula (1) below:

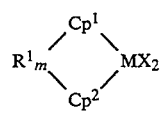
(1)

where $Cp^1$, and $Cp^2$ are independently a substituted or unsubstituted cyclopentadienyl group; $R^1$ is an alkylene group having 1 to 20 carbons, a dialkylsilylene group, a dialkylgermanylene group, an alkylphosphindiyl group, or an alkylimno group, $R^1$ crosslinking $Cp^1$ and $Cp^2$; m is 0 or 1; M is titanium, zirconium, or hafnium; and X is fluorine, chlorine, bromine, iodine, an alkyl group, or an aryl group; the organoaluminum compound (B) being represented by the general formula (2):

$$Al(R^2)_3 \qquad (2)$$

where each of the $R^2$ groups is independently a halogen, hydrogen, an alkyl group, an alkoxy group, or an aryl group, and at least of one the $R^2$ groups is an alkyl group; and the ionic compound (C) being represented by the general formula (3) below:

$$[C]\,[A] \qquad (3)$$

where [C] is a cation and [A] is an anion; the catalyst system further containing a boron compound (D) represented by the general formula (4) below:

$$B(R^3)_3 \qquad (4)$$

where each of the $R^3$ groups is independently a halogen, hydrogen, an alkyl group, an alkoxy group, or an aryl group, in an amount of from 0.01 mol to 0.8 mol per mol of the metallocene compound (A).

According to another aspect of the present invention, there is provided an olefin polymerization catalyst which comprises an ionic metallocene compound (a), and an organoaluminum compound (b) as catalyst components: the ionic metallocene compound (a) being represented by the general formula (5) below:

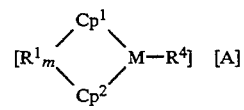
(5)

where $Cp^1$, $Cp^2$, $R^1$, m, and M are the same as defined in the formula (1), $R^4$ is an alkyl group or an aryl group, and [A] is an anion; and the organoaluminum compound (b) being represented by the general formula (2):

$$Al(R^2)_3 \qquad (2)$$

where $R^2$ is as defined above, and at least one of the $R^2$ groups is an alkyl group; the catalyst system further containing a boron compound represented by the general formula (4) below:

$$B(R^3)_3 \qquad (4)$$

where $R^3$ is as defined above; in an amount of from 0.01 mol to 0.8 mol per mol of the ionic metallocene compound (a).

According to a still another aspect of the present invention, there is provided a process for polymerization of ethylene or α-olefin employing the aforementioned catalyst system comprising a metallocene, an organoaluminum compound, an ionic compound, and a boron compound.

According to a further aspect of the present invention, there is provided a process for polymerization of ethylene or α-olefin employing the aforementioned catalyst system comprising an ionic metallocene, an organoaluminum compound, and a boron compound.

The process for producing an olefin polymer, according to an aspect of the present invention, employs a polymerization catalyst system which comprises a metallocene compound (A), an organoaluminum compound (B), and an ionic compound (C) as catalyst components: the metallocene compound (A) being represented by the general formula (1) below:

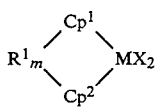 (1)

where $Cp^1$, and $Cp^2$ are independently a substituted or unsubstituted cyclopentadienyl group; $R^1$ is an alkylene group having 1 to 20 carbons, a dialkylsilylene group, a dialkylgermanylene group, an alkylphosphindiyl group, or an alkylimino group, $R^1$ crosslinking $Cp^1$ and $Cp^2$; m is 0 or 1; M is titanium, zirconium, or hafnium; and X is fluorine, chlorine, bromine, iodine, an alkyl group, or an aryl group; the organoaluminum compound (B) being represented by the general formula (2):

$$Al(R^2)_3 \qquad (2)$$

where each of the $R^2$ groups is independently a halogen, hydrogen, an alkyl group, an alkoxy group, or an aryl group, and at least of one the $R^2$ groups is an alkyl group; and the ionic compound (C) being represented by the general formula (3) below:

$$[C][A] \qquad (3)$$

where [C] is a cation and [A] is an anion; the catalyst system further containing a boron compound (D) represented by the general formula (4) below:

$$B(R^3)_3 \qquad (4)$$

where each of the $R^3$ groups is independently a halogen, hydrogen, an alkyl group, an alkoxy group, or an aryl group, in an amount of from 0.01 mol to 0.8 mol per mol of the metallocene compound (A).

The process for producing an olefin polymer, according to another aspect of the present invention, employs an olefin polymerization catalyst comprises an ionic metallocene compound (a), and an organoaluminum compound (b) as catalyst components: the ionic metallocene compound (a) being represented by the general formula (5) below:

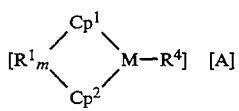 (5)

where $Cp^1$, $Cp^2$, $R^1$, m, and M are the same as defined in the formula (1), $R^4$ is an alkyl group or an aryl group, and [A] is an anion; and the organoaluminum compound (b) being represented by the general formula (2):

$$Al(R^2)_3 \qquad (2)$$

where $R^2$ is a defined above, and at least one of the $R^2$ groups is an alkyl group; the catalyst system further containing a boron compound represented by the general formula (4) below:

$$B(R^3)_3 \qquad (4)$$

where $R^3$ is as defined above; in an amount of from 0.01 mol to 0.8 mol per mol of the ionic metallocene compound (a).

DETAILED DESCRIPTION OF THE PREFERRED EMBODIMENT:

The metallocene compound (A) used in the present invention is represented by the general formula (1). Specific examples thereof include
bis(cyclopentadienyl)titanium dichloride,
bis(pentamethylcyclopentadienyl)titanium dichloride,
ethylenebis(indenyl)titanium dichloride,
ethylenebis(tetrahydroindenyl)titanium dichloride,
isopropylidene(cyclopentadienyl) (fluorenyl)titanium dichloride,
dimethylsilylbis(methylcyclopentadienyl)titanium dichloride,
dimethylsilylbis(2,4-dimethylcyclopentadienyl)titanium dichloride,
bis(cyclopentadienyl)zirconium dichloride,
bis(pentamethylcyclopentadienyl)zirconium dichloride,
ethylenebis(indenyl)zirconium dichloride,
ethylenebis(tetrahydroindenyl)zirconium dichloride,
isopropylidene(cyclopentadienyl) (fluorenyl)zirconium dichloride,
dimethylsilylbis(methylcyclopentadienyl)zirconium dichloride,
dimethylsilylbis(2,4-dimethylcyclopentadienyl)zirconium dichloride,
bis(cyclopentadienyl)hafnium dichloride,
bis(pentamethylcyclopentadienyl)hafnium dichloride,
ethylenebis(indenyl)hafnium dichloride,
ethylenebis(tetrahydroindenyl)hafnium dichloride,
isopropylidene(cyclopentadienyl) (fluorenyl)hafnium dichloride,
dimethylsilylbis(methylcyclopentadienyl)hafnium dichloride,
dimethylsilylbis(2,4-dimethylcyclopentadienyl)hafnium dichloride.

Specific compounds having other substituents within the scope of the invention may also be effectively used.

The ionic metallocene compound (a) employed in the present invention may be prepared, for example, by mixing a neutral derivative of a metallocene with an ionic compound in a solvent and, if desired, recovering the product. The molar ratio of the neutral metallocene derivative to the ionic compound used therefor is preferably in the range of from 1:0.2 to 1:100, more preferably from 1:1 to 1:10.

The ionic compound (C) being represented by the general formula (3) below $$[C][A] \qquad (3)$$

where [C] is a cation and [A] is an anion.

The solvent used in the above reaction includes toluene, hexane, and methylene chloride, but is not limited thereto.

The neutral metallocene compound used in the preparation of the ionic metallocene compound of the present invention is represented by the general formula (6) below:

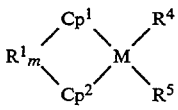 (6)

wherein $Cp^1$, $Cp^2$, $R^1$, m, and M are as defined in the general formula (1) or (5), and $R^5$ is hydrogen, a halogen, an amide group, or an alkyl group.

The specific examples of the neutral metallocene compound include
bis(cyclopentadienyl)titaniumdimethyl,
bis(pentamethylcyclopentadienyl)titaniumdimethyl,
ethylenebis(indenyl)titaniumdimethyl,
ethylenebis(tetrahydroindenyl)titaniumdimethyl,
isopropylidene(cyclopentadienyl) (fluorenyl)titaniumdimethyl,
dimethylsilylbis(methylcyclopentadienyl)titaniumdimethyl,
dimethylsilylbis(2,4-dimethylcyclopentadienyl)titaniumdimethyl,
bis(cyclopentadienyl)zirconiumdimethyl,
bis(pentamethylcyclopentadienyl)zirconiumdimethyl,
ethylenebis(indenyl)zirconiumdimethyl,
ethylenebis(tetrahydroindenyl)zirconiumdimethyl,
isopropylidene(cyclopentadienyl) (fluorenyl)zirconiumdimethyl,
dimethylsilylbis(methylcyclopentadienyl)zirconiumdimethyl,
dimethylsilylbis(2,4-dimethylcyclopentadienyl)zirconiumdimethyl,
bis(cyclopentadienyl)hafniumdimethyl,
bis(pentamethylcyclopentadienyl)hafniumdimethyl,
ethylenebis(indenyl)hafniumdimethyl,
ethylenebis(tetrahydroindenyl)hafniumdimethyl,
isopropylidene(cyclopentadienyl) (fluorenyl)hafniumdimethyl,
dimethylsilylbis(methylcyclopentadienyl)hafniumdimethyl, and
dimethylsilylbis(2,4-dimethylcyclopentadienyl)hafniumdimethyl.
Specific compounds having other substituents within the scope of the invention may also be effectively used.

The organoaluminum compound (B) or (b) is represented by the general formula (2). Specific examples thereof include trimethylaluminum, triethylaluminum, triisopropylaluminum, tri(n-propyl)aluminum, triisobutylaluminum, tri(n-butyl)aluminum, tri(n-hexyl)aluminum, tri(n-octyl)aluminum, dimethylaluminum chloride, diethylaluminum chloride, diisopropylaluminum chloride, di(n-propyl)aluminum chloride, diisobutylaluminum chloride, di(n-butyl)aluminum chloride, dimethylaluminum ethoxide, diethylaluminum ethoxide, diisopropylaluminum ethoxide, di(n-propyl)aluminum ethoxide, diisobutylaluminum ethoxide, di(n-butyl)aluminum ethoxide, dimethylaluminum hydride, diethylaluminum hydride, diisopropylaluminum hydride, di(n-propyl)aluminum hydride, diisobutylaluminum hydride, and di(n-butyl)aluminum hydride.

The ionic compound (C) or (C) is represented by the general formula (3). The specific examples thereof include
tri(n-butyl)ammonium tetrakis(p-tolyl)borate,
tri(n-butyl)ammonium tetrakis(m-tolyl)borate,
tri(n-butyl)ammonium tetrakis(2,4-dimethylphenyl)borate,
tri(n-butyl)ammonium tetrakis(3,5-dimethylphenyl)borate,
tri(n-butyl)ammonium tetrakis(pentafluorophenyl)borate,
N,N-dimethylanilinium tetrakis(p-tolyl)borate,
N,N-dimethylanilinium tetrakis(m-tolyl)borate,
N,N-dimethylanilinium tetrakis(2,4-dimethylphenyl)borate,
N,N-dimethylanilinium tetrakis(3,5-dimethylphenyl)borate,
N,N-dimethylanilinium tetrakis(pentafluorophenyl)borate,
triphenylcarbenium tetrakis(p-tolyl)borate,
triphenylcarbenium tetrakis(m-tolyl)borate,
triphenylcarbenium tetrakis(2,4-dimethylphenyl)borate,
triphenylcarbenium tetrakis(3,5-dimethylphenyl)borate,
triphenylcarbenium tetrakis(pentafluorophenyl)borate,
tropylium tetrakis(p-tolyl)borate,
tropylium tetrakis(m-tolyl)borate,
tropylium tetrakis(2,4-dimethylphenyl)borate,
tropylium tetrakis(3,5-dimethylphenyl)borate, and
tropylium tetrakis(pentafluorophenyl)borate.

The boron compound (D) is represented by the general formula (4). The specific examples thereof include trifluoroborane, trichloroborane, tribromoborane, trimethylborane, triethylborane, triisopropylborane, tri(n-propyl)borane, triisobutylborane, tri(n-butyl)borane, triphenylborane, and tri(pentafluorophenyl)borane.

The organoaluminum compound in the present invention is used preferably at a concentration of from $10^{-5}$ mol/l to $10^{-3}$ mol/l.

The olefin specifically includes α-olefin such as ethylene, propylene, 1-butene, 4-methyl-1-pentene, 1-hexene, and 1-octene. A mixture of two or more of the olefins may be polymerized. Further, the olefin can be copolymerized with a conjugated or non-conjugated diene such as butadiene, 1,5-hexadiene, 1,4-pentadiene, 1,7-octadiene, 1,8-nonadiene, and 1,9-decadiene; styrene; or a cyclic olefin such as cyclopropene, cyclohexene, norbornene, and dicyclopentadiene.

The polymerization of olefin in the present invention is conducted by any known process for olefin polymerization with a metallocene compound. The polymerization is conducted, for example, in bulk, in a slurry, or in a gas phase at a temperature of from −80° C. to 250° C., preferably from 25° C. to 80° C.

In the first aspect of the present invention, the olefin is polymerized, for example, by mixing the metallocene compound (A) and the organoaluminum compound (B) with an olefin, and the ionic compound (C) containing the boron compound (D) is brought into contact with the above mixture. In the olefin polymerization, the molar ratio of the metallocene compound (A) to the ionic compound (C) is normally in the range of from 1:0.2 to 1:100, preferably from 1:1 to 1:10. The addition of the boron compound (D) is preferably in an amount of from 0.01 mol to 0.8 mol, more preferably from 0.05 mol to 0.5 mol per mol of the metallocene compound (A). Thereby the activity of the catalyst system is greatly improved. On the contrary, if the boron compound (D) is used in an amount of less than 0.01 mol, or more than 0.8 mol per mol of the metallocene compound (A), the catalyst activity is extremely low.

In the second aspect of the present invention, the olefin is polymerized, for example, by preparing an ionic metallocene compound (a) by mixing a neutral metallocene derivative with an ionic compound in a solvent, adding thereto a boron compound, and bringing the mixture into contact with a mixture of an organoaluminum compound (b) and an olefin. In the olefin polymerization, the addition of the boron compound is preferably in an amount of from 0.01 mol to 0.8 mol, more preferably from 0.05 mol to 0.5 mol per mol of the ionic metallocene compound (a). Thereby the activity of the catalyst system is greatly improved. On the contrary, if the boron compound is used in an amount of less than 0.01 mol, or more than 0.8 mol per mol of the ionic metallocene compound (a), the catalyst activity is extremely low.

The present invention is described in more detail by reference to examples without limiting the invention in any way.

EXAMPLE 1

In a 2-liter autoclave, 500 ml of toluene was placed. Thereto 0.66 mmol of triethylaluminum was added, and the mixture was stirred for 10 minutes. To this solution, a solution of 1.3 $\mu$mol of ethylenebis(indenyl)zirconium dichloride in 1 ml of toluene was added, and the mixture was stirred for 20 minutes. Then 500 ml of propylene was introduced, and the mixture was stirred for 10 minutes. Further, 1.3 $\mu$mol of N,N-dimethylanilinium tetrakis(pentafluorophenyl)borate and 0.13 $\mu$mol of tris(pentafluorophenyl)borane were pressed into the autoclave with 10 ml of toluene, and polymerization was allowed to proceed at 40° C. for one hour. The reaction product was dried in vacuo at about 70° C. for 6 hours. Thus 160 g of propylene polymer was obtained.

COMPARATIVE EXAMPLE 1

Polymerization was conducted in the same manner as in Example 1 except that tris(pentafluorophenyl)borane was not added. Thereby 95 g of propylene polymer was obtained.

COMPARATIVE EXAMPLE 2

Polymerization was conducted in the same manner as in Example 1 except that the amount of tris(pentafluorophenyl)borane was changed to 1.3 $\mu$mol. Thereby 21 g of propylene polymer was obtained.

EXAMPLE 2

In a 2-liter autoclave, 500 ml of toluene was placed. Thereto 0.66 mmol of triethylaluminum was added, and the mixture was stirred for 10 minutes. To this solution, a solution of 5 $\mu$mol of isopropylidene(cyclopentadienyl)(fluorenyl)zirconium dichloride in 1 ml of toluene was added, and the mixture was stirred for 20 minutes. Then 500 ml of propylene was introduced thereto, and the mixture was stirred for 10 minutes. Further, 6.6 $\mu$mol of N,N-dimethylanilinium tetrakis(pentafluorophenyl)borate and 0.66 $\mu$mol of tris(pentafluorophenyl)borane were pressed into the autoclave with 10 ml of toluene, and polymerization was allowed to proceed at 40° C. for one hour. The reaction product was dried in vacuo at about 70° C. for 6 hours. Thus 95 g of propylene polymer was obtained.

COMPARATIVE EXAMPLE 3

Polymerization was conducted in the same manner as in Example 2 except that tris(pentafluorophenyl)borane was not added. Thereby 20 g of propylene polymer was obtained.

COMPARATIVE EXAMPLE 4

Polymerization was conducted in the same manner as in Example 2 except that the amount of tris(pentafluorophenyl)borane was changed to 6.6 $\mu$mol. Thereby 15 g of propylene polymer was obtained.

EXAMPLE 3

A solution of 0.66 mmol triethylaluminum in 5 ml of toluene was placed in a 2-liter autoclave as the reactor. The temperature of the reactor was controlled to be at 70° C. Therein, 1.4 liters of propylene was introduced, and the mixture was stirred at a rate of 1200 rpm for 10 minutes.

6.6 $\mu$mol of N,N-dimethylanilinium tetrakis(pentafluorophenyl)borate and 0.66 $\mu$mol of tris(pentafluorophenyl)borane were dissolved in 10 ml of toluene. Separately, 5 $\mu$mol of ethylenebis(indenyl)zirconiumdimethyl was dissolved in 10 ml of toluene. These solutions were mixed and stirred at room temperature for 5 minutes.

The resulting catalyst mixture was charged into the reactor with nitrogen pressure. Thereby the temperature in the reactor rose up to 75° C. At the end of the polymerization reaction, the reactor was cooled, and the unreacted propylene was discharged from the reactor. The reaction product was dried in vacuo at about 70° C. for 6 hours. Thus 695 g of propylene polymer was obtained.

COMPARATIVE EXAMPLE 5

Polymerization was conducted in the same manner as in Example 3 except that tris(pentafluorophenyl)borane was not added. Thereby 116 g of propylene polymer was obtained.

COMPARATIVE EXAMPLE 6

Polymerization was conducted in the same manner as in Example 3 except that the amount of tris(pentafluorophenyl)borane was changed to 6.6 $\mu$mol. Thereby 25 g of propylene polymer was obtained.

EXAMPLE 4

A solution of 0.66 mmol triethylaluminum in 5 ml of toluene was placed in a 2-liter autoclave as the reactor. The temperature of the reactor was controlled to be at 70° C. Therein, 1.4 liters of propylene was introduced, and the mixture was stirred at a rate of 1200 rpm for 10 minutes.

72 $\mu$mol of N,N-dimethylanilinium tetrakis(pentafluorophenyl)borate and 7.2 $\mu$mol of tris(pentafluorophenyl)borane were dissolved in 10 ml of toluene. Separately, 55 $\mu$mol of isopropylidene(cyclopentadienyl)(fluorenyl)zirconiumdimethyl was dissolved in 10 ml of toluene. These solutions were mixed and stirred at room temperature for 5 minutes.

The resulting catalyst mixture was charged into the reactor with nitrogen pressure. Thereby the temperature in the reactor rose up to 75° C. At the end of the polymerization reaction, the reactor was cooled, and the unreacted propylene was discharged from the reactor. The reaction product was dried in vacuo at about 70° C. for 6 hours. Thus 410 g of propylene polymer was obtained.

COMPARATIVE EXAMPLE 7

Polymerization was conducted in the same manner as in Example 4 except that tris(pentafluorophenyl)borane was not added. Thereby 90 g of propylene polymer was obtained.

COMPARATIVE EXAMPLE 8

Polymerization was conducted in the same manner as in Example 4 except that the amount of tris(pentafluorophenyl)borane was charged to 72 μmol. Thereby 45 g of propylene polymer was obtained.

As described above, olefin polymers were produced with high efficiency with a high catalyst activity by use of a catalyst comprising a metallocene compound, an organoaluminum compound, and an ionic compound together with a boron compound, or a catalyst comprising an ionic metallocene compound, an organoaluminum compound, and a boron compound.

What is claimed is:

1. A catalyst for polymerization of an olefin, which comprises a metallocene compound (A), an organoaluminum compound (B), and an ionic compound (C) as catalyst components: the metallocene compound (A) being represented by the formula (1) below:

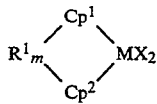 (1)

where $Cp^1$, and $Cp^2$ are independently a substituted or unsubstituted cyclopentadienyl group; $R^1$ is an alkylene group having 1 to 20 carbons, a dialkylsilylene group, a dialkylgermanylene group, an alkylphosphindiyl group, or an alkylimino group, $R^1$ crosslinking $Cp^1$ and $Cp^2$; m is 0 or 1; M is titanium, zirconium, or hafnium; and X is fluorine, chlorine, bromine, iodine, an alkyl group, or an aryl group; the organoaluminum compound (B) being represented by the formula (2):

$$Al(R^2)_3 \qquad (2)$$

where each of the $R^2$ groups is independently a halogen, hydrogen, an alkyl group, an alkoxy group, or an aryl group, and at least of one of the $R^2$ groups is an alkyl group; and the ionic compound (C) being represented by the formula (3) below:

$$[C][A] \qquad (3)$$

where [C] is a cation and [A] is an anion; the catalyst system further containing a boron compound (D) represented by the formula (4) below:

$$B(R^3)_3 \qquad (4)$$

where each of the $R^3$ groups is independently a halogen, hydrogen, an alkyl group, an alkoxy group, or an aryl group, in an amount of from 0.01 mol to 0.8 mol per mol of the metallocene compound (A).

2. A catalyst for polymerization of an olefin, which comprises an ionic metallocene compound (a), and an organoaluminum compound (b) as catalyst components: the ionic metallocene compound (a) being represented by the formula (5) below:

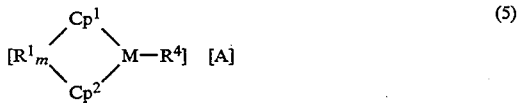 (5)

where $Cp^1$, and $Cp^2$ are independently a substituted or unsubstituted cyclopentadienyl group; $R^1$ is an alkylene group having 1 to 20 carbons, a dialkylsilylene group, a dialkylgermanylene group, an alkylphosphindiyl group, or an alkylimino group, $R^1$ crosslinking $Cp^1$ and $Cp^2$; m is 0 or 1; $R^4$ is an alkyl group or an aryl group; M is titanium, zirconium, or hafnium; and [A] is an anion; and the organoaluminum compound (b) being represented by the formula (2):

$$Al(R^2)_3 \qquad (2)$$

where each of the $R^2$ groups is independently a halogen, hydrogen, an alkyl group, an alkoxy group, or an aryl group, and at least one of the $R^2$ group is an alkyl group; the catalyst system further containing a boron compound represented by the general formula (3) below:

$$B(R^3)_3 \qquad (3)$$

where each of the $R^3$ groups is independently a halogen, hydrogen, an alkyl group, an alkoxy group, or an aryl group, in an amount of from 0.01 mol to 0.8 mol per mol of the ionic metallocene compound (a).

* * * * *